(No Model.)
C. SCHLATTER.
STOP WATCH.
No. 448,549. Patented Mar. 17, 1891.
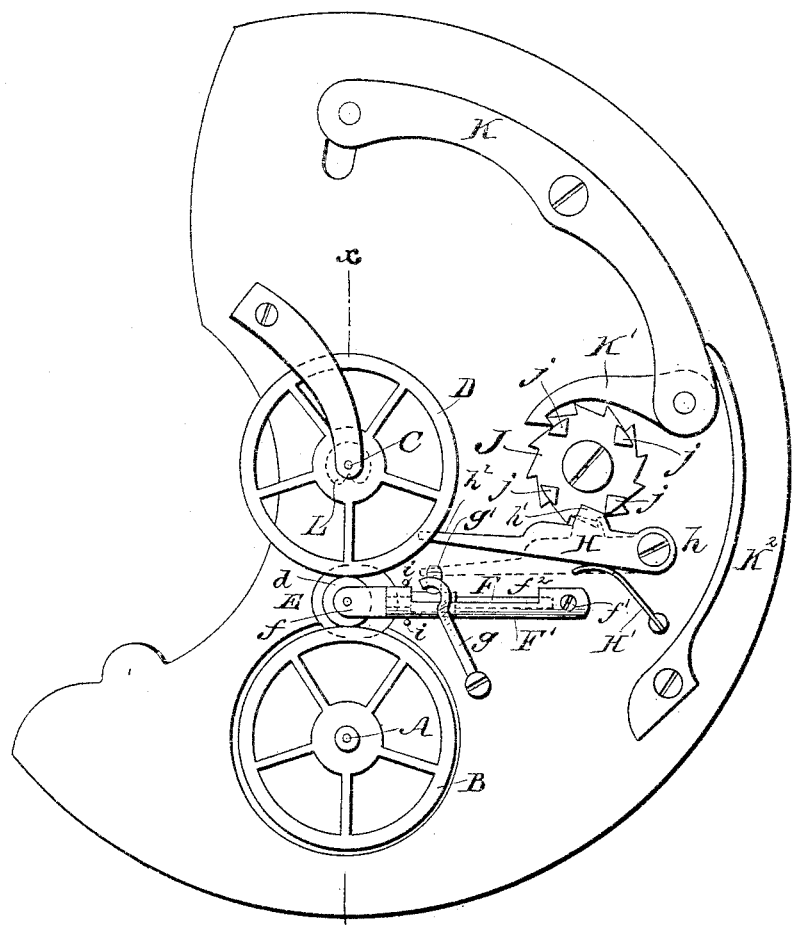
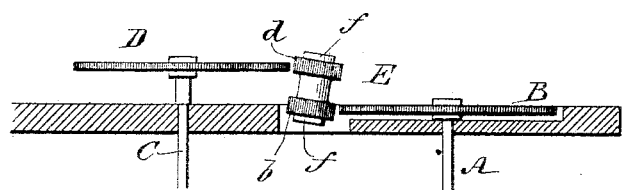
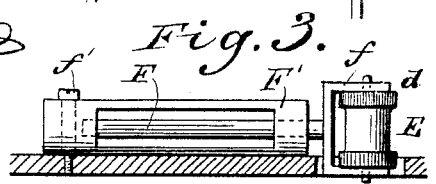
WITNESSES:
INVENTOR:
C. Schlatter
BY Munn & Co.
ATTORNEYS

UNITED STATES PATENT OFFICE.

CHARLES SCHLATTER, OF HOBOKEN, NEW JERSEY.

STOP-WATCH.

SPECIFICATION forming part of Letters Patent No. 448,549, dated March 17, 1891.

Application filed March 24, 1890. Serial No. 345,028. (No model.)

*To all whom it may concern:*

Be it known that I, CHARLES SCHLATTER, of Hoboken, in the county of Hudson and State of New Jersey, have invented a new and Improved Stop-Watch, of which the following is a full, clear, and exact description.

The object of my invention is to simplify and improve the starting and stopping mechanism of stop-watches; and the invention consists, mainly, in combining with the main wheels of the stop-movement the wheel of the seconds-hand staff or fourth-wheel staff and the wheel on the staff of the stop-hand, an intermediate wheel or intermediate wheels being arranged to be oscillated to put the stop-movement in and out of action.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is an enlarged plan view of the top plate of a watch-movement having applied thereto the essential parts of the stop-movement, including my invention and the common main wheels and the ratchet mechanism for operating the intermediate wheels from the stem of the watch. Fig. 2 is a sectional elevation on line $x\ x$ of Fig. 1. Fig. 3 is an enlarged view of the pivoted frame or tube and the shaft and intermediate wheel.

A represents the seconds-hand or fourth-wheel staff, which receives its motion in the usual manner. To this staff is secured the wheel B, which receives the same movement as the seconds-hand or fourth wheel of the watch.

C is the central or stop staff, to which the stop-hand (not shown) is attached at the face of the watch, and to which the wheel D is attached. This wheel corresponds in diameter to the wheel B and is elevated above the latter, as shown clearly in Fig. 2.

E is the intermediate wheel, formed with the two contact-surfaces $b\ d$ for the wheels B D, respectively. When in contact with the wheels B D, the axis of the intermediate wheel E is in the same plane with the staffs A C; but when out of contact its axis is at an angle to the said staffs, as shown in Fig. 2. In other words, the wheel E must be oscillated to perform its office. For this purpose, though I might use other means, I employ the shaft F, which carries the lugs $f f$, in which the intermediate wheel is pivoted. This shaft is pivoted in the frame or tube F', which is pivoted at $f'$ and held from swinging laterally too far by the stop or limit pins or studs $i\ i$.

The object of pivoting the frame F' is to give a certain freedom to the wheel E, which will adapt it to accommodate itself to any irregularity that may exist in the wheels B D without binding and stopping the watch. One side of the frame F' is cut away, as shown at $f^2$, and in this space the shaft F is provided with the stud $g'$, on which presses the spring $g$, which constantly tends to turn the shaft to bring the contact-surfaces of the wheel E into engagement with the wheels B D.

H is a lever pivoted at $h$ and formed with a cam $h'$ to contact with the studs $j$ on the ratchet-wheel J. The point $h^2$ of this lever reaches abreast of the stud $g'$, so that when said lever is turned to the position shown in dotted lines by one of the studs $j$ it strikes under said stud and turns the shaft F and the intermediate wheel to the position shown in Fig. 2, in which position the wheel D and staff C remain at rest and wheel B is disengaged from the intermediate wheel E.

H' is the spring which throws the lever H away from under the stud $g'$, when the stud $j$, which last operated the lever, passes the cam $h'$. When so forced from the stud $g'$, the spring $g$ turns the shaft F to bring the intermediate wheel E into contact with the wheels B D, which will communicate the motion of wheel B to wheel D, its staff C, and the stop-hand (not shown) applied in the ordinary manner to the said staff C at the face of the watch.

The ratchet-wheel J is turned, in the usual manner, from the stem of the watch through the medium of the lever K, pawl K', and spring K². The ratchet J, with its studs $j$, also serves to operate a lever in the common manner against the heart-cam L for setting the wheel D, its staff C, and the stop-hand back to 12 on the dial or to some other fixed point.

Having thus described my invention, what

I claim as new, and desire to secure by Letters Patent, is—

1. The combination, with the pinions arranged in different vertical and horizontal planes, of oscillating pinions arranged between the same and movable out of engagement with both of said pinions, substantially as described.

2. The combination, with the pinions having stationary arbors and arranged in different vertical and horizontal planes, of a rocking frame arranged between said pinions and carrying pinions, said frame being movable to disengage the second-named pinions from both the first-named ones, substantially as described.

3. The frame F', pivoted at one end, and the shaft F, journaled therein and formed or provided with a stud $g'$, in combination with the intermediate wheel E, substantially as described.

4. The frame F', provided with the shaft F, having arm $g'$ and intermediate wheel E, in combination with the lever H and means for operating the same for turning the shaft and the intermediate wheel, substantially as described.

5. The frame F', pivoted at one end and cut away at $f^2$, and the shaft F, journaled in said frame and provided with the intermediate wheel and the arm $g'$, in combination with the spring $g$, lever H, and the ratchet-wheel J, provided with the studs $j$, substantially as described.

CHARLES SCHLATTER.

Witnesses:
H. A. WEST,
EDGAR TATE.